United States Patent
Cheng (10) Patent No.: US 6,246,593 B1
(45) Date of Patent: Jun. 12, 2001

(54) TOPOLOGY-INDEPENDENT SYNCHRONOUS RECTIFIER COMMUTATION CIRCUIT

(75) Inventor: Wing Ling Cheng, Taipo (HK)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/307,262

(22) Filed: May 6, 1999

(51) Int. Cl.[7] .................... H02M 3/335; H02M 7/04; H02M 7/217
(52) U.S. Cl. ................... 363/17; 363/25; 363/89; 363/127
(58) Field of Search .................... 363/17, 24, 25, 363/84, 89, 125, 127

(56) References Cited

U.S. PATENT DOCUMENTS

| | | | |
|---|---|---|---|
| 4,616,174 | * 10/1986 | Jorgensen | 324/117 R |
| 5,097,403 | * 3/1992 | Smith | 363/127 |
| 5,636,116 | * 6/1997 | Milavec et al. | 363/89 |
| 5,691,628 | * 11/1997 | Martin | 323/327 |
| 5,946,207 | * 8/1999 | Schoofs | 363/127 |
| 6,021,059 | * 2/2000 | Kennedy | 363/127 |

* cited by examiner

Primary Examiner—Peter S. Wong
Assistant Examiner—Bao Q. Vu
(74) Attorney, Agent, or Firm—Coudert Brothers (57) ABSTRACT

The use of synchronous rectifier MOSFETs in the secondary circuit of AC/DC converters is made possible in synchronous rectifier unfriendly topologies such as flyback converters by sensing the onset of forward current in the MOSFET drain-source circuit, optionally converting that current information into logic level signals, and using the information or signals to drive the gate of the synchronous rectifier MOSFET.

19 Claims, 6 Drawing Sheets

TOPOLOGY-INDEPENDENT SYNCHRONOUS RECTIFIER COMMUTATION CIRCUIT

FIELD OF THE INVENTION

This invention relates to AC/DC and DC/DC power converters, and more specifically to circuits using synchronous rectifier commutation.

BACKGROUND OF THE INVENTION

The high frequency rectifier stage, usually the final stage of a switchmode power supply converter, contributes approximately 30% to 40% of the total loss of the converter. Traditionally, diode devices are used as rectifiers. Typical examples of such devices are silicon fast recovery rectifiers, Schottky rectifiers, GaAs ultra-fast recovery rectifiers, and fast recovery epitaxial diodes (FRED).

The diode can be represented as a device with a constant forward voltage drop in series with a dynamic resistance. This forward voltage drop often contributes a majority of the power dissipation of rectifier diodes.

As prior art power converter topology and semiconductor switching devices improved in performance, power converters in the range of 30-to 300 W became able to easily achieve 85% to 87% efficiency with conventional diode rectifiers. To further improve efficiency, it has become increasingly popular to use MOSFETs as rectifiers. The MOSFET source-drain has an intrinsic anti-parallel body diode that behaves like a moderate speed rectifier. When the MOSFET is off, the external circuit sees the body diode. When the MOSFET is driven on, the low turn-on channel resistance of the device is responsible for the conduction loss of the MOSFET, and the diode voltage drop disappears, resulting in lower power dissipation and therefore higher converter efficiency. A MOSFET used as a rectifier has to be driven on and off at the right time, hence the name Synchronous Rectifier.

Some power converter topologies are inherently suited for synchronous rectifier commutation. These topologies include the common forward converter and the Hybridge converter. These topologies are direct drive capable, i.e., the voltage that appears across the transformer secondary is a natural match of the current waveform. The body diode conducts before the correct gate drive voltage is asserted.

These simple circuits do, however, have certain limitations:

1) The transformer voltage has to be at the correct level, which is usually +/−20V for non-logic level MOSFETs and +/−10V maximum for logic level MOSFETs. Forcing in an appropriate drive level will result in excessive power dissipation and/or possible reduction in device reliability. If the voltage is not within an acceptable range, extra secondary windings or extra circuits have to be used to derive the gate drive signal.

2) The secondary voltage at different polarities has to be well defined under full line and load conditions, which implies that the transformer primary has to be suitably clamped to achieve such conditions. Workable examples of suitable topologies are clamped-forward, resonant reset forward, half-bridge and full-bridge topologies. Topologies with a simple transformer reset like a resistor, capacitor and diode network (RCD) snubbed forward converter are not synchronous rectifier friendly.

3) The transformer design has to give special consideration to the high gate-source capacitance of the MOSFETs used. Most of the time MOSFETs are connected in parallel to obtain low enough drain-source resistance, and therefore the gate-source is high enough to create a serious voltage spike problem on the transformer secondary. This makes the specification difficult, and causes gate drive signal deterioration.

4) Prior art circuits do not address reverse recovery, a major cause of synchronous power loss.

The above limitations of the prior art can be overcome by various topologies, but the topologies suitable for this purpose are generally unfriendly to synchronous rectifier commutation. Essentially, synchronous rectifier unfriendly topologies have the following characteristics:

1) The voltage that appears on the transformer secondary cannot provide the right timing or voltage level, even with complicated signal conditioning circuits. This results in cross-conduction and excessive power loss in the synchronous rectifier circuit.

2) Some topologies may work with a primary-derived synchronous rectifier drive signal; however, the complications of component count, safety isolation requirements and extra circuit power dissipation defeat the purpose of synchronous rectification.

3) The current profile of the secondary circuit creates excessive reverse recovery loss in the MOSFETs and excessive voltage spikes during turn-off. This makes synchronous rectifier applications ineffective.

SUMMARY OF THE INVENTION

The present invention overcomes the above-described limitations and problems of the prior art by sensing current flow through the synchronous rectifier MOSFET and using that current flow to turn the MOSFET on and off. Current flow for this purpose can be sensed in any of several ways: by using a current transformer; by detecting the voltage drop across the effective drain-source on resistance of the MOSFET; or by using Hall effect current sensing.

The inventive method has several advantages:

1) The on-off switching of the synchronous rectifier MOSFET is a direct function of current passing through the device. The possibility of cross-conduction is thus minimized.

2) Current sensing need not be accurate. Only the presence and absence of current needs to be sensed for correct control. This makes the current-sensing circuit simple and easy to optimize in terms of speed and stability.

3) The MOSFET synchronous rectifier device is turned off when the current reaches a pre-set low level which usually results in near optimal turn-off. This minimizes any reverse recovery problems.

4) A variety of current sensing techniques are well known for various current levels, as listed above.

5) All control information is derived from the secondary side. Information from the primary side is not required. This simplifies interface circuits and safety isolation designs.

6) The gate drive signal is derived and conditioned to maintain a well defined voltage level at the gate of the synchronous rectifier device. Other features can be build in, such as undervoltage lockout or turning the gate drive off in light load situations to improve efficiency.

DESCRIPTION OF THE PREFERRED EMBODIMENT

Figure 1:
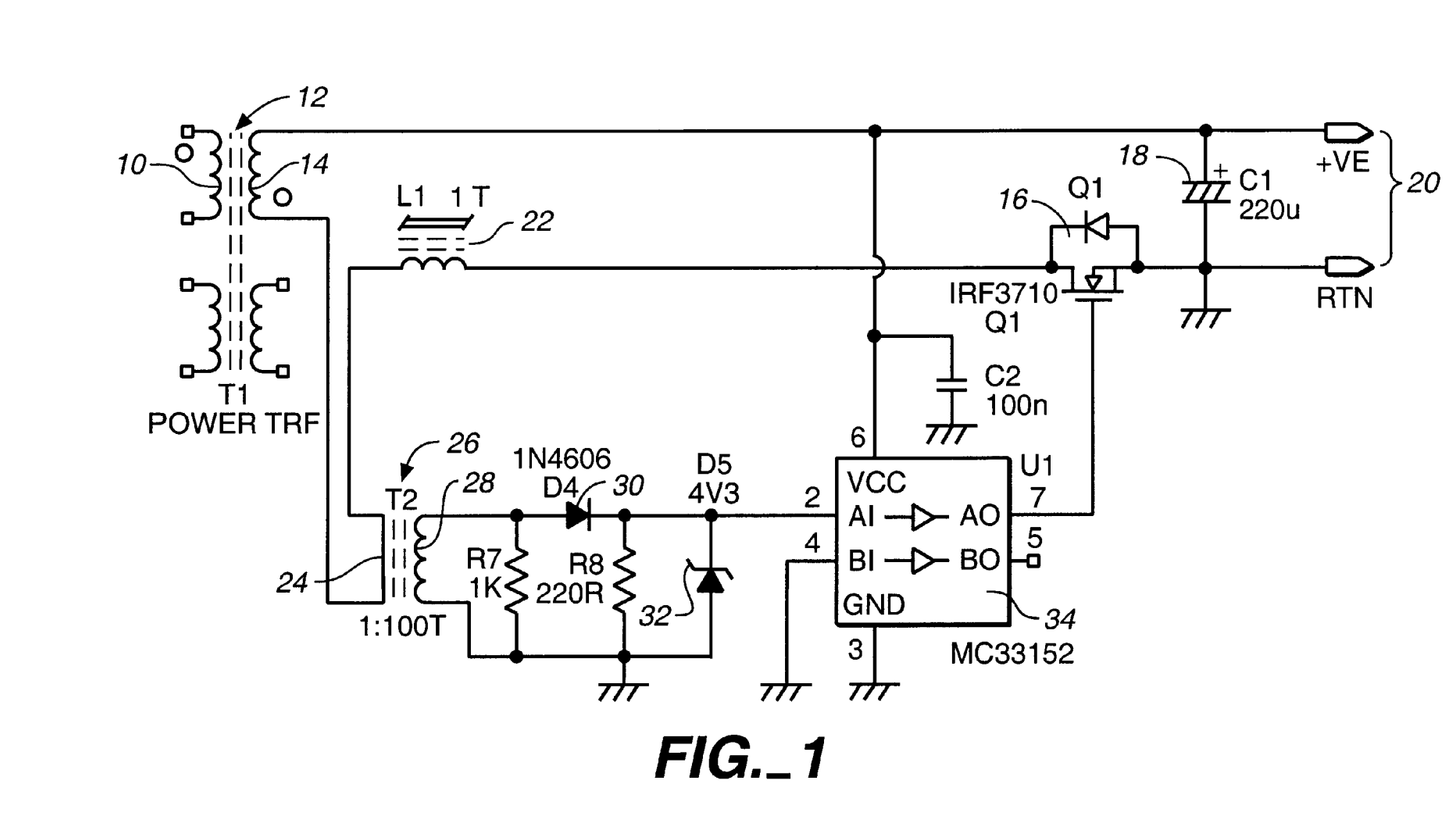
FIG. 1 is a circuit diagram of the secondary portion of a flyback synchronous rectifier converter using a current transformer for current sensing.

FIG. 1 shows a first preferred embodiment of the invention in a flyback converter. Rectified AC power is conventionally applied to the primary winding 10 of a transformer 12. The primary winding is conventionally switched on and off at high frequency so as to induce a high-frequency alternating current in the secondary winding 14. A MOSFET 16 acts as a synchronous rectifier by blocking power current flow during the negative half-wave of the AC current induced in winding 14. A capacitor 18 acts as a filter to deliver uniform DC power to the load output 20, and a spike killer inductance 22 is placed in the secondary circuit to reduce reverse-recovery loss and prevent overvoltage on the MOSFET 16.

The primary winding 24 of a current transformer 26, which may, for example, have a turns ratio of 1:100, is connected in series with the secondary winding 14 of transformer 10. The turns ratio is chosen so as to provide low power dissipation in the current sensing circuit, while producing a reasonable current sense waveform from the current flowing through the body diode of MOSFET 16.

The secondary winding 28 produces an output which mirrors the current in winding 24. The output of winding 28 is rectified by diode 30 and is clamped to a logic level by zener diode 32. The clamped logic signal is applied to a conventional gate drive 34, e.g., an integrated circuit such as the Motorola MC33152, whose output drives the MOSFET 16. The MOSFET 16 is thus driven on whenever a current of the correct polarity is present in the secondary circuit of transformer 10.

Figure 2:
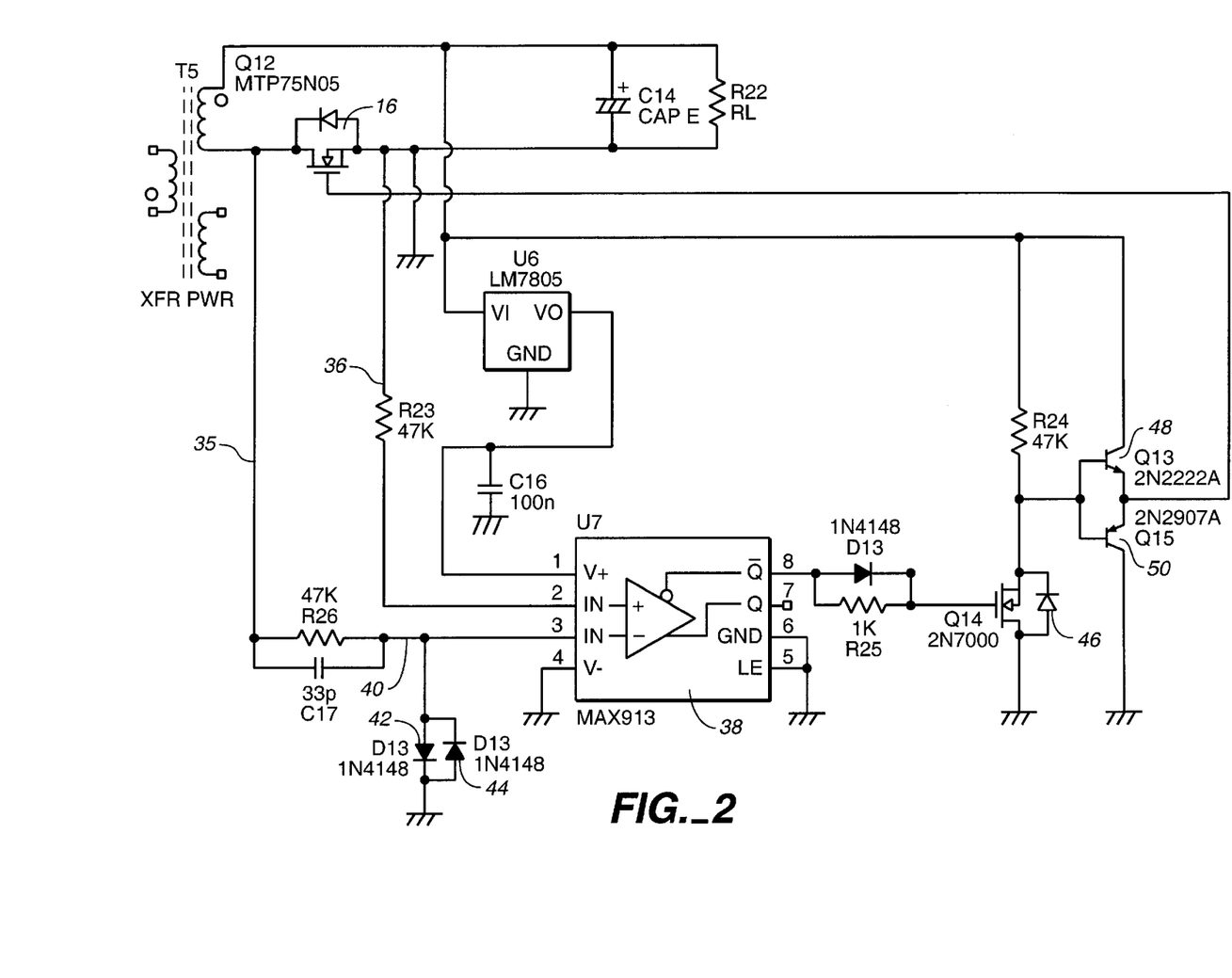
FIG. 2 is a circuit diagram showing a converter similar to that in FIG. 1 but using a drain-source on-resistance sensor for MOSFET control.

FIG. 2 illustrates the same flyback converter as FIG. 1 but using the drain-source resistance of the MOSFET 16 as the current sensing element. The voltage drop across the drain-source resistance of MOSFET 16 appears on lines 35, 36, which are the inputs to a high-speed comparator 38. The negative input 40 of comparator 38 is clamped to ground by diodes 42, 44. The inverted Q output of comparator 38 drives the gate of a MOSFET 46, which level-translates the output of comparator 38 and feeds an emitter-follower pair 48, 50. The latter in turn drives the gate of MOSFET 16. Note that this circuit takes advantage of the propagation delay of MOSFET 46 to filter any noise in the rising edge of MOSFET 16 when the device is turned off.

Figure 3:
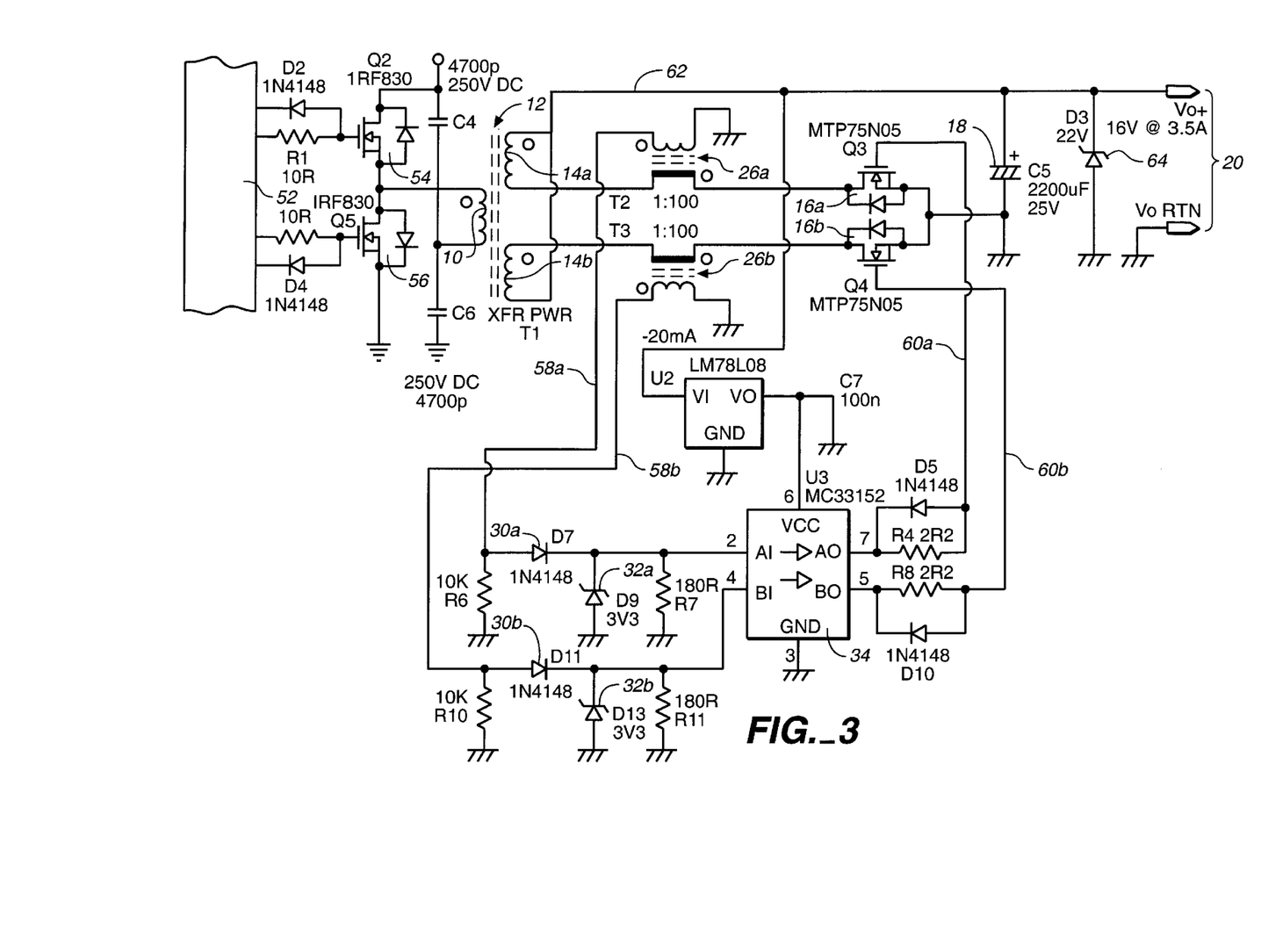
FIG. 3 is a circuit diagram of an expanded circuit of the type shown in FIG. 1 for a Class D output stage.

As shown in FIG. 3, the circuit of FIG. 1 can be readily used in a Class D converter. In FIG. 3, a complementary gate drive circuit 52 drives two MOSFET power switches 54, 56 to alternately ground the primary winding 10 and connect it to the DC power supply (e.g. 250 V DC). The transformer 12 induces identical AC currents of opposite phase in the secondary windings 14a and 14b.

Current transformers 26a, 26b alternately produce current signals on lines 58a and 58b. The positive half-cycles of these signals are applied to the inputs of a dual gate drive 34 through diodes 30a, 30b and are clamped to logic levels by zener diodes 32a, 32b. The outputs 60a, 60b of gate drive 34 drive the gates of MOSFETs 16a, 16b so as to produce a rectified DC on line 62 which is filtered and smoothed by capacitor 18. The resulting load on output 20 may be, for example, 16 V DC at 3.5 A. Excessive voltage surges on the output 20 are prevented by a zener diode 64 which maintains the output 20 at a level not exceeding, for example, 22 V.

Figure 4:
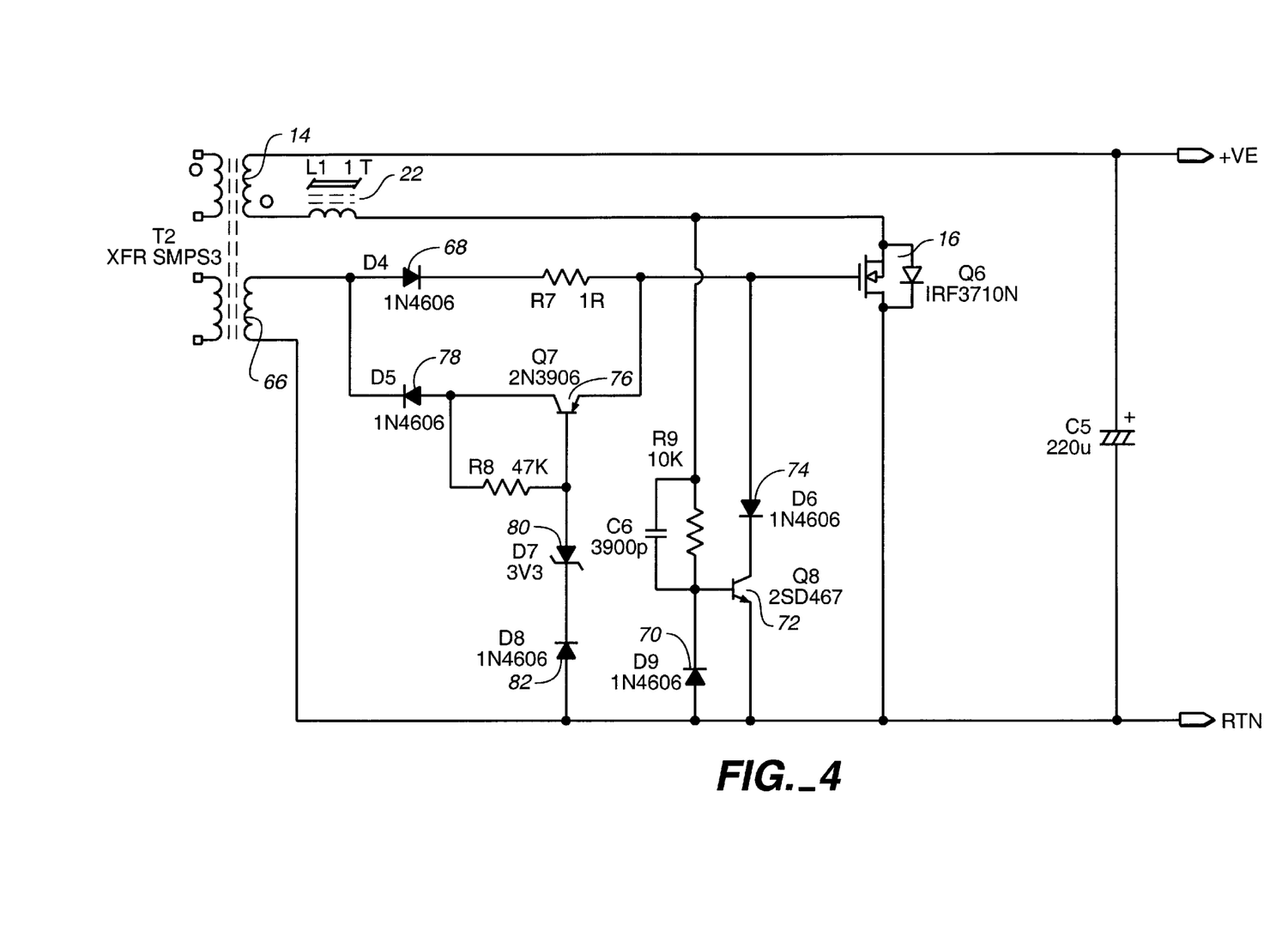
FIG. 4 is a circuit diagram of a converter similar to that of FIG. 1 but using an analog gate control.

FIG. 4 illustrates another embodiment of the invention wherein the gate drive of the synchronous rectifier is generated using an analog signal. In this embodiment, an auxiliary secondary winding 66 is used to produce the current signal which drives the gate of MOSFET 16. The positive half-wave of winding 66 is applied directly to the gate of MOSFET 16 through diode 68 to turn MOSFET 16 on. At the onset of the negative half-wave of windings 14 and 66, diode 70 turns on transistor 72 which speeds up the turn-off of MOSFET 16 through diode 74.

During the negative half-wave, MOSFET 16 is kept off by transistor 76 and diode 78. Diodes 80 and 82 prevent ringing on the auxiliary winding 66. As in the circuit of FIG. 1, inductance 22 eliminates reverse recovery overshoot. The circuit of FIG. 4 has an inherent timing skew between the voltage and the current through MOSFET 16. That is, the turn-off voltage appears later than the current termination. This results in extra reverse recovery current through MOSFET 16.

Figure 5:
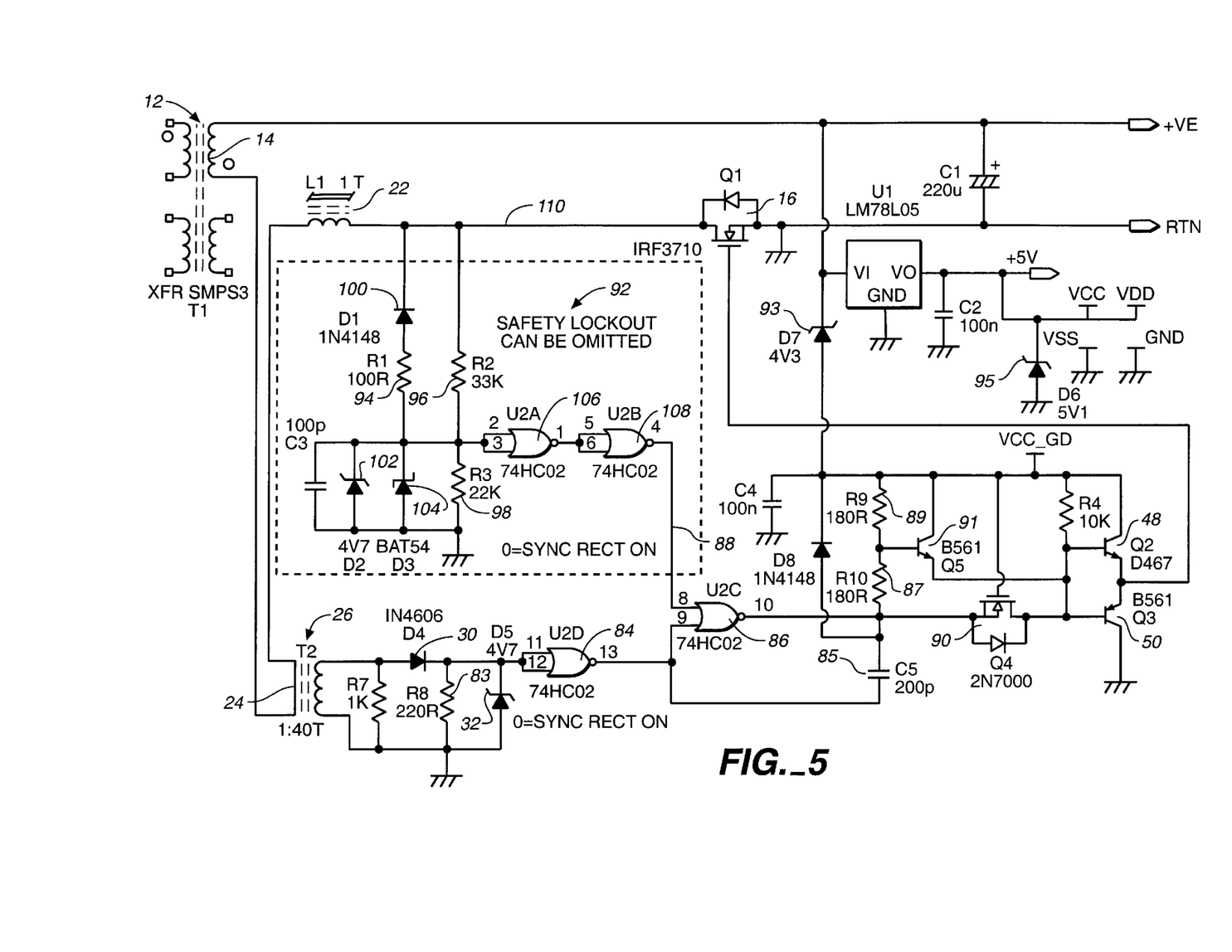
FIG. 5 is a circuit diagram of a converter using an optimized logic-driven gate control.

FIG. 5 illustrates a preferred more specific embodiment of the circuit shown in FIG. 1. As in the circuit of FIG. 1, in the circuit of FIG. 5, the same current generated by current transformer 26 (which, in this embodiment, may have a 1:40 turns ratio) is applied through diode 30 to a resistor 83. This information signal is clamped to a logic level by zener diode 32, and is applied to the inputs of a conventional NOR gate 84 connected to act as an inverter. The inverted output of gate 84 is applied to one of the inputs of a NOR gate 86. The output of gate 86 is thus high whenever positive half-wave current flows thorough primary winding 24 of current transformer 26, provided that line 88 is low as discussed hereinafter.

The output of gate 86 is level-shifted by a MOSFET 90 to operate the emitter follower drive transistors 48, 50 that drive the gate of MOSFET 16. The circuit formed by capacitor 85, resistors 87, 89 and transistor 91 provides a speed-up path for better rising edge performance. The zener diode 93 reduces the gate drive amplitude to save power. Zener diode 95 dissipates the bootstrap effect of the gate-source capacitance of transistor 91. High-capacitance MOS devices are preferably used for speed.

The line 88 is the output of an optional safety lockout circuit 92. The action of resistors 94, 96, 98 and diodes 100, 102, 104 cause the inputs of an inverting NOR gate 106 to go high during the negative half-cycle of winding 14, and low during the positive half-cycle. The output of NOR gate 106 is coupled to a second NOR gate 108 that again inverts the signal. Because the NOR gates 106, 108 act as a double inverter, the input logic levels of gate 106 also appear on line 88. Thus, any condition in which a positive voltage appears across MOSFET 16 will, at gate 86, block MOSFET 16 from being driven on.

Although more complex than the embodiment of FIG. 1, the circuit of FIG. 5 provides the best performance. It optimizes the gate drive signal and minimizes the reverse recovery effect, which is reduced to the intrinsic reverse recovery of the device. As an example of performance, a circuit of this type operating at 250 kHz with a 2.8 A 16 V output was found to be over 95% efficient.

Figure 6:
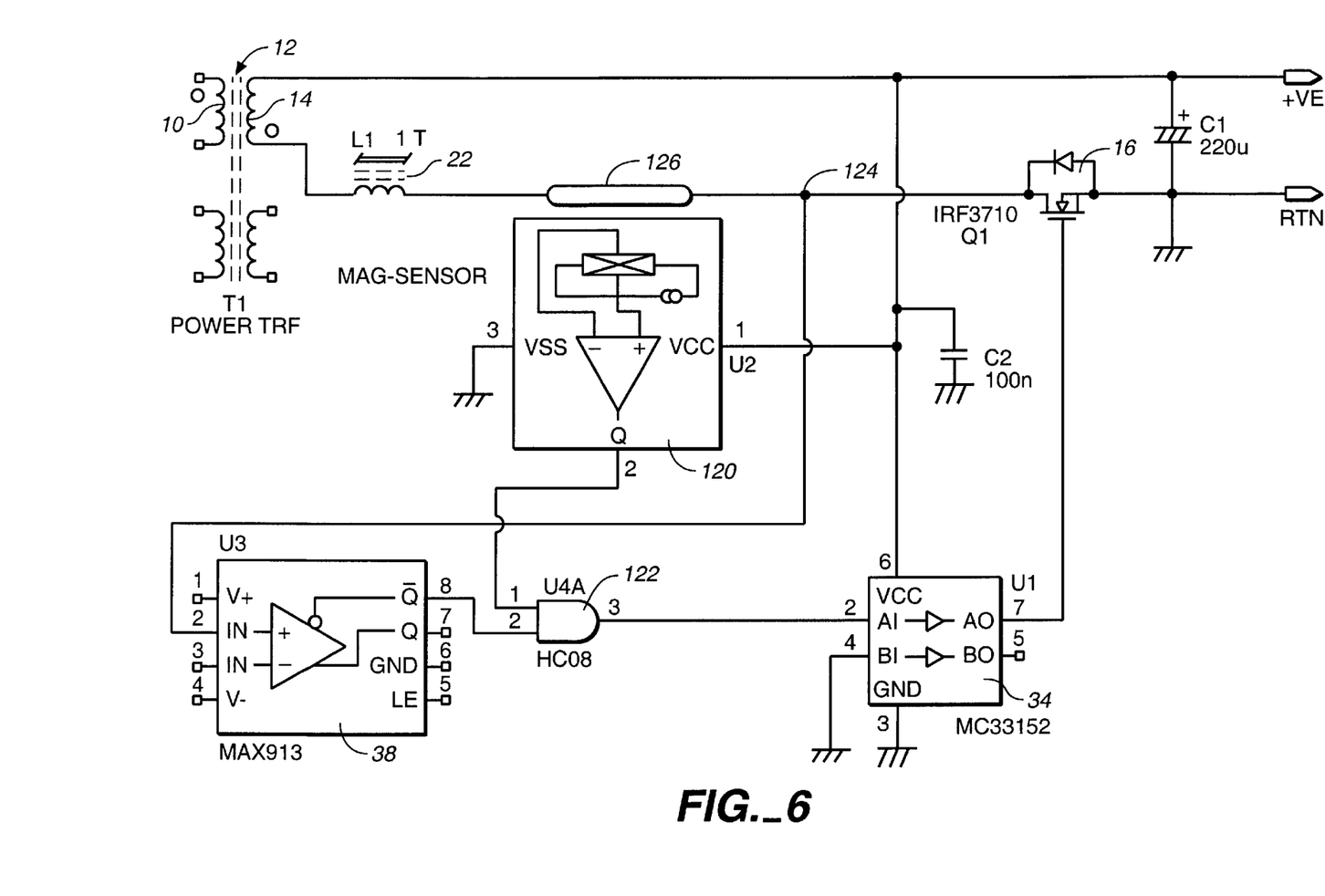
FIG. 6 is a circuit diagram of a converter using a magnetic current sensor gate control.

FIG. 6 illustrates a circuit embodiment in which a magnetic current sensor 120 is used to achieve synchronous rectification of MOSFET 16. The embodiment of FIG. 6 has the advantages that it reduces the complexity and enhances the noise-immunity of a circuit which achieves synchronous rectification of MOSFET 16. A magnetic current sensor 120 measures the magnitude of the current flowing in the series circuit to the body-diode of MOSFET 16. Those of ordinary skill in the art are familiar with a variety of ways to couple a magnetic sensor to a series circuit. A shown in FIG. 6, in a preferred embodiment, magnetic current sensor 120 measures the current passing through the terminals of a conductive element 126 electrically coupling secondary winding 14 to the body-diode of MOSFET 16. The principles of magnetic current sensors are well known, and include a variety of techniques to measure the current passing through the terminals of a conductive element 126. Some magnetic current sensors, such as magneto-resistive current sensors, can measure the magnitude, but not the polarity, of the current passing through a conductive element 126. Other magnetic sensors, such as a Hall-effect sensor, can measure both the magnitude and polarity of a current passing through the terminals of a conductive element 126.

It is undesirable that MOSFET 16 is turned-on when a positive voltage appears across its drain-source terminals. Consequently, additional logic elements are preferably included when magneto-resistive current sensors are used to ensure that MOSFET 16 is only driven into an on-state when the measured current sensed by magnetic current sensor 120 is of the proper polarity. As shown in FIG. 6, comparator 38 and AND gate 122 form a control unit to activate gate drive 34 to switch-on MOSFET 16 to achieve the desired synchronous rectification when the magnitude and polarity of the current flow is correct. AND gate 122 has as its first input a signal from magnetic current sensor 120. This signal is high if the magnitude of the current is above a threshold current level. AND gate 122 has as its second input the output of comparator 38 which is coupled to the node 124. As indicated in FIG. 6, the voltage at an appropriate node in the series circuit, such as node 124 between the secondary winding 14 and MOSFET 16, is indicative of the polarity of the current flow in the series circuit. Consequently, the signal from comparator 38 will be high if the polarity of the current flow is correct. Thus, when the sensed current in MOSFET 16 has the correct magnitude and polarity for synchronous rectification, the output of AND gate 122 will be high and gate drive 34 will switch on MOSFET 16.

While the embodiment of FIG. 6 may be used for a variety of magnetic current sensors, the logic control function performed by comparator 38 and AND gate 122 may be unnecessary for those magnetic current sensors 120, such as Hall-effect current sensors, that measure both the magnitude and polarity of a current. An appropriately configured Hall-effect sensor would produce a logical "high" signal for a current with the correct polarity whose magnitude is above a threshold trigger level. The output of the Hall-effect sensor could be directly coupled to gate drive 34. However, those of ordinary skill in the art are familiar with a variety of predrivers and/or inverters that may be used, as required, to improve the coupling of the Hall-effect current sensor to a particular gate drive 34, i.e., to match the output of a Hall-effect sensor to the turn-on/turn-off characteristics of a particular gate drive 34 to achieve the desired synchronous rectification effect.

It will be understood that the exemplary topology-independent synchronous rectifier commutation circuits described herein and shown in the drawings represent only presently preferred embodiments of the invention. Indeed, various modifications and additions may be made to such embodiments without departing from the spirit and scope of the invention. Thus, other modifications and additions may be obvious to those skilled in the art and may be implemented to adapt the present invention for use in a variety of different applications.

What is claimed is:

1. A method of driving synchronous rectifier field effect transistors in the output circuit of a secondary winding of a high-frequency isolation transformer of a power converter, comprising the steps of:

a) sensing current flow in the drain-source circuit of a synchronous rectifier field effect transistor; and b) turning said field effect transistor on when current flow in a predetermined direction is sensed;

whereby said sensed current flow is used to achieve synchronous rectification.

2. The method of claim 1, comprising the further step of converting a sensed current flow to a logic level signal, and turning said field effect transistor on when said logic level signal is present.

3. The method of claim 1, in which said current flow is sensed by a current transformer.

4. The method of claim 1, in which said current flow is sensed by measuring the voltage drop across the drain-source resistance of said field effect transistor.

5. The method of claim 1, in which said current flow is sensed by a magnetic current sensor.

6. The method of claim 5, wherein said magnetic current sensor is a Hall-effect sensor.

7. The method of claim 5, wherein said magnetic current sensor is a magneto-resistive current sensor.

8. The method of claim 1, in which said power converter is a flyback converter.

9. A power converter, comprising:

a) a DC voltage input;

b) a power transformer having a primary and a secondary winding, said primary winding being connected to said DC voltage input;

c) a control circuit for coupling current through said primary winding at high frequency, thereby causing an alternating current to be induced in said secondary winding;

d) said secondary winding being connected to a DC output in a series circuit with the drain-source circuit of a field effect transistor having a drain, a source, a gate, and a body diode interconnecting said drain and source; and e) a gate drive control circuit to sense when the current flow through said series circuit is of a predetermined polarity;

f) said field effect transistor being so connected to said secondary winding and said DC output that said body diode conducts whenever said secondary winding drives said DC output with said predetermined polarity; and g) said gate drive control circuit configured to turn said field effect transistor on whenever a current flow of said predetermined polarity is sensed in said series circuit;

whereby said field effect transistor acts as a synchronous rectifier.

10. The power converter of claim 9, wherein said gate drive control circuit comprises:

h) a current transformer having a first winding connected in series with said series circuit, and a second winding; and i) a logic circuit so connected to said second winding and said gate as to drive said gate into an on condition in response to the presence in said second winding of a current indicative of current flow of said predetermined polarity in said series circuit.

11. The power converter of claim 10, further comprising:

j) a second logic circuit so connected between said series circuit and said first-named logic circuit as to block said first-named logic circuit from driving said gate on when a voltage not of said predetermined polarity appears across said drain-source circuit of said field effect transistor.

12. The power converter of claim 9, wherein said gate drive control circuit comprises:

h) a logic circuit having a pair of inputs, and an output connected to said gate;

i) a comparator in said logic circuit, said comparator being connected to said inputs and being arranged to put out a logic signal when the voltages at said inputs have a predetermined polar relationship with respect to each other;

j) said inputs being connected, respectively, to said drain and said source of said field effect transistor; and k) said logic circuit being arranged to drive said gate on whenever the polar relationship of said input is such as to indicate current flow of said predetermined polarity through said field effect transistor.

13. The power converter of claim 9, wherein said gate drive control circuit comprises:

h) a current transformer having a first winding connected in series with said series circuit, and a second winding;

i) a diode connected to said second winding so as to rectify its output; and j) a voltage-limiting diode connected to said second winding to limit its output to a logic level; and k) said rectified and limited output of said second winding being applied to said gate so as to turn it on whenever current of said predetermined polarity flows in said series circuit.

14. The power converter of claim 13, in which said logic level output of said second winding is amplified prior to application to said gate.

15. The power converter of claim 9, wherein said gate drive control circuit comprises:

h) an inductance connected in series with said series circuit to reduce reverse-recovery loss.

16. The power converter of claim 9, wherein said gate drive control circuit comprises:

h) a magnetic current sensor coupled to said series circuit to measure the magnitude of the current flow in said series circuit; and i) a logic control circuit having as a first input the output of said magnetic current sensor and a second input that is a voltage corresponding to the polarity of the current flow in said series circuit; said logic circuit being arranged to drive said gate on whenever the magnitude of said current flow is above a threshold trigger level and the polar relationship of said second input is such as to indicate current flow of said predetermined polarity through said field effect transistor.

17. The power converter of claim 9, wherein said gate drive control circuit comprises:

h) a Hall-effect magnetic current sensor to sense if a current flow of said predetermined polarity occurs in said series circuit.

18. The power converter of claim 17, wherein said gate drive control circuit comprises:

l) a driver coupled to the output of said Hall-effect magnetic current sensor.

19. The power converter of claim 9, wherein said gate drive control circuit comprises:

h) magnetic current sensor means to determine if a current flow of said predetermined polarity occurs in said series circuit; and i) control means to turn on said gate.

* * * * *